United States Patent
Miller (10) Patent No.: US 12,448,956 B2
(45) Date of Patent: Oct. 21, 2025

(54) DUPLEX DRIVE HEAD

(71) Applicant: Centerline Manufacturing LLC, Winnsboro, TX (US)

(72) Inventor: Cory L. Miller, Winnsboro, TX (US)

(73) Assignee: Centerline Manufacturing LLC, Winnsboro, TX (US)

( * ) Notice: Subject to any disclaimer, the term of this patent is extended or adjusted under 35 U.S.C. 154(b) by 453 days.

(21) Appl. No.: 17/420,826

(22) PCT Filed: Dec. 3, 2019

(86) PCT No.: PCT/US2019/064220
§ 371 (c)(1),
(2) Date: Jul. 6, 2021

(87) PCT Pub. No.: WO2020/117791
PCT Pub. Date: Jun. 11, 2020

(65) Prior Publication Data
US 2022/0090588 A1 Mar. 24, 2022

Related U.S. Application Data

(60) Provisional application No. 62/917,334, filed on Dec. 3, 2018.

(51) Int. Cl.
*F04B 9/02* (2006.01)
*F16H 37/12* (2006.01)

(52) U.S. Cl.
CPC .............. *F04B 9/02* (2013.01); *F16H 37/122* (2013.01)

(58) Field of Classification Search
CPC ...... F04B 53/007; F04B 39/0094; F04B 1/02; F04B 9/02; F16H 37/122; F16H 61/0031
See application file for complete search history.

(56) References Cited

U.S. PATENT DOCUMENTS

| | | | |
|---|---|---|---|
| 1,363,793 A * | 12/1920 | Kirkham | F16N 13/20 418/199 |
| 1,934,191 A * | 11/1933 | Hoffman | B60K 5/04 475/198 |
| 2,369,747 A | 2/1945 | Munn | |
| 4,739,678 A * | 4/1988 | Miura | F16H 57/0483 74/467 |
| 5,908,014 A | 6/1999 | Leithinger | |
| 2008/0095650 A1 | 4/2008 | Divisi | |
| 2009/0092510 A1* | 4/2009 | Williams | F04B 1/00 417/521 |

(Continued)

FOREIGN PATENT DOCUMENTS

DE 202015102989 U1 6/2015

*Primary Examiner* — Minnah L Seoh
*Assistant Examiner* — Gregory T Prather (57) ABSTRACT

Described herein are embodiments of a drive head for use with positive displacement pumps. In one embodiment, a drive head for use with a pump comprises a central shaft having a first end and a second end; first and second drive rod connection points coupled to the central shaft proximate the first and second ends, the first and second drive rod connection points being located radially outside of a centerline of the central shaft; first and second drive rods coupled to the first and second drive rod connection points; and a central support member coupled to the central shaft between the first and second drive rod connection points.

20 Claims, 8 Drawing Sheets

(56) References Cited

U.S. PATENT DOCUMENTS

2015/0275891 A1 10/2015 Chong
2018/0010590 A1 1/2018 Berthaud et al.
2018/0087492 A1 3/2018 Powell

* cited by examiner

DUPLEX DRIVE HEAD

CROSS-REFERENCE TO RELATED APPLICATION

This application is the National Stage of, and therefore claims the benefit of, International Application No. PCT/US2019/064220 filed on Dec. 3, 2019, entitled "DUPLEX DRIVE HEAD," which was published in English under International Publication Number WO 2020/117791 on Jun. 11, 2020, and has a priority date of Dec. 3, 2018, based on application 62/917,334. Both of the above applications are commonly assigned with this National Stage application and are incorporated herein by reference in their entirety.

TECHNICAL FIELD

This application is directed, in general, to positive displacement pumps and, more specifically, to a drive head supported by a central support member for use in positive displacement pumps.

BACKGROUND

Positive displacement pumps (commonly known as, e.g. Duplex Pumps or Triplex Pumps) are found throughout the drilling industry. These pumps are normally used to pump drilling fluid, such as, e.g. drilling mud through a circulatory system whose intent is to remove cuttings such as, e.g. rock chips, sand, shale, etc. and other elements through which the wellbore passes during drilling. Duplex or triplex pumps are positive displacement pumps that use a piston within a cylinder to pump/pressurize the drilling fluid. Duplex pumps typically have two cylinders and triplex pumps typically have three cylinders. The operation is relatively simple. A piston moves back and forth (reciprocates) within a cylinder. Fluid enters through an intake and intake valve, which in some embodiments may be a simple check valve, during the pump stroke, which pulls the piston away from the cylinder head thereby creating a low pressure in the cylinder. On the "compression" stroke, the piston moves towards the cylinder head thereby compressing the fluid trapped within the cylinder. This action causes the intake valve to close, and when the pressure of the fluid is equal to or greater than the outlet fluid, the outlet valve, which may also be a simple check valve in some embodiments, opens and fluid exhausts to the system.

Duplex pumps are "double-acting," meaning that there are two intake and outlet valves on the cylinder with the actual piston located between both cylinder heads and free to move back and forth between the heads. Thus, as the piston moves toward one end, pressure is built within that section of the cylinder and fluid passes out of the discharge valve. As this pressure action is taking place, the intake valve opens at the other end of the cylinder and fluid is drawn into the cylinder. When the stroke reverses, the suction side becomes the pressured side and fluid exits the discharge valve.

Accordingly, there must be one or more components capable of reciprocating the piston within the cylinder. The piston is attached to a piston rod using usual engineering techniques. In turn the piston rod is attached to a drive head that can reciprocate the rod. Current drive heads used by manufacturers of positive displacement pumps include shafts that extend beyond drive plates of the drive head to be supported at opposing ends.

BRIEF DESCRIPTION

Reference is now made to the following descriptions taken in conjunction with the accompanying drawings, in which.

DETAILED DESCRIPTION

In the drawings and descriptions that follow, like parts may be marked throughout the specification and drawings with the same reference numerals, respectively. The drawn figures are not necessarily, but may be, to scale. Certain features of the disclosure may be shown exaggerated in scale or in somewhat schematic form and some details of certain elements may not be shown in the interest of clarity and conciseness. The present disclosure may be implemented in embodiments of different forms. Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed herein may be employed separately or in any suitable combination to produce desired results. Moreover, all statements herein reciting principles and aspects of the disclosure, as well as specific examples thereof, are intended to encompass equivalents thereof. Additionally, the term, "or," as used herein, refers to a non-exclusive or, unless otherwise indicated.

Unless otherwise specified, use of the terms "connect," "engage," "couple," "attach," or any other like term describing an interaction between elements is not meant to limit the interaction to direct interaction between the elements and may also include indirect interaction between the elements described.

Figure 1A:
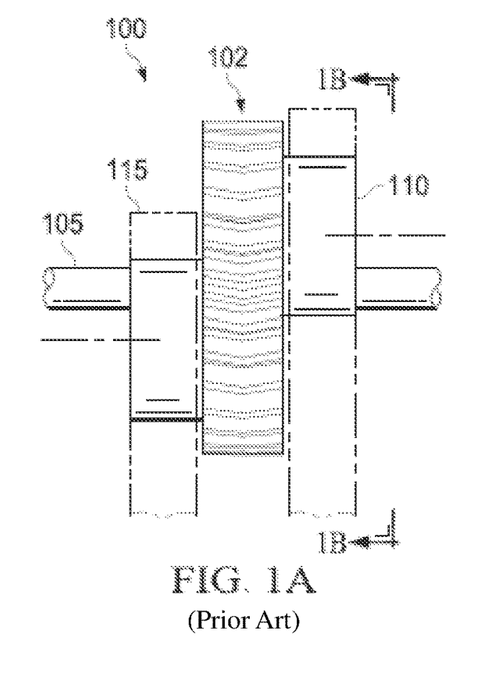
FIG. 1A is a top view of one drive head currently known in the art.
Figure 1B:
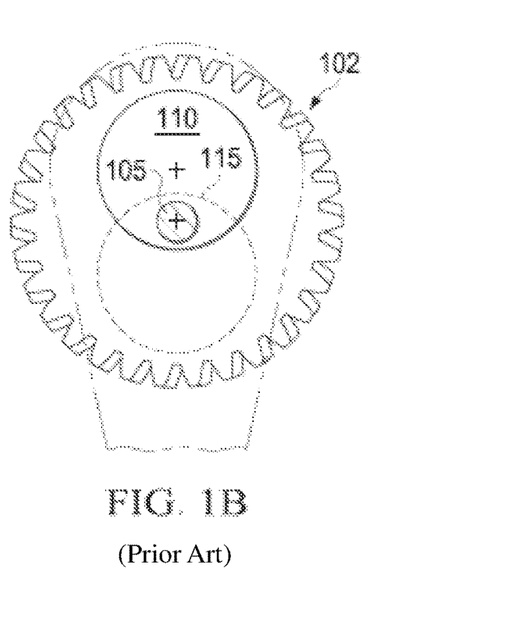
FIG. 1B is a sectional view of the drive head of FIG. 1 taken at 1B-1B.

One drive head currently used in the art is referred to as a Gardner-Denver drive head 100, which is shown in FIGS. 1A and 1B. The Gardner-Denver drive head 100 comprises a drive gear 102 which is driven by a corresponding herringbone gear attached to a rotating shaft 105 further attached to a rotating prime mover (not shown) which has opposing offset lobes 110 and 115 on each side of the gear. The lobes 110 and 115 are offset from each other by 90 degrees and are offset about an axis of rotation for the gear 102. The 90-degree offset may be used to alternate the flow surges of the two double-acting pump cylinders to best synchronize flow performance for smoothest discharge flow. Each of the first and second lobes 110 and 115 have a large driver rod attached thereto and as each lobe rotates, the attached driver rod follows the rotation about the central axis of the gear. If this were not so, then the driver rod would clash with the gear shaft. The driver rod attaches to the piston rod via a crosshead piston, which stabilizes the linear reciprocation. The Gardner-Denver drive head 100 may then produce reciprocating motion for the duplex cylinders. While the Gardner-Denver drive head 100 is shown as a duplex pump, the Gardner-Denver drive head 100 may be expanded to include three drive lobes for a triplex pump, in which the drive lobes may be offset by approximately 60 degrees.) The driver head, driver rods, and piston rods are all contained within an assembly, which also holds the pump cylinders. This assembly provides the needed bearings, isolation of fluids, and lubrication.

Figure 2A:
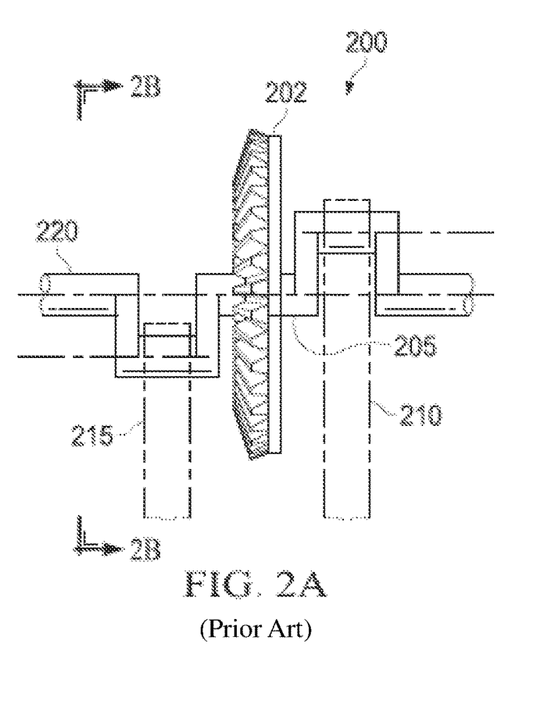
FIG. 2A is a top view of another drive head currently known in the art.
Figure 2B:
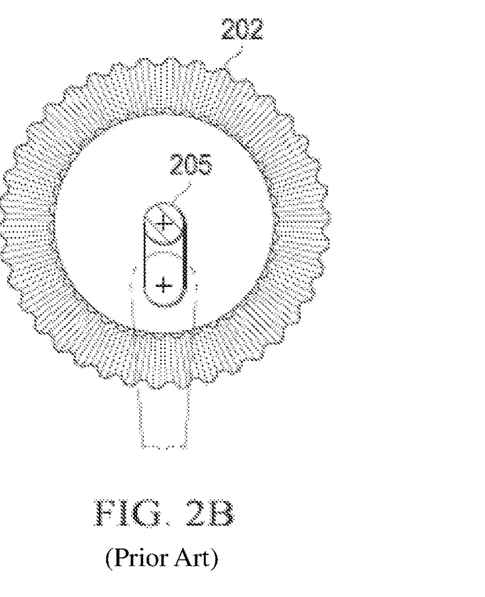
FIG. 2B is a sectional view of the drive head of FIG. 2 taken at 2B-2B.

Another drive head currently known in the art is referred to as a Wheatley drive head 200, shown in FIGS. 2A and 3B. The Wheatley drive head 200 includes a drive gear 202, which may be driven by a corresponding herringbone gear attached to a rotating shaft 205 further attached to a rotating prime mover (not shown) attached to a crankshaft 220. The Wheatley drive head 200 acts similar to a standard combustion engine. Drive rods 210 and 215 are attached to the crankshaft 220 and are in turn attached to piston rods via a crosshead piston, which stabilizes the linear reciprocation. Thus the Wheatley drive head 200 may produce reciprocating motion for duplex cylinders. The Wheatley drive head 200 may also be expanded to be used with a triplex pump by adding a third driver rod. The drive gear 202, driver rods 210 and 215, and piston rods are all contained within an assembly, which also holds the pump cylinders. This assembly provides the needed bearings, isolation of fluids, and lubrication. In the embodiment shown, the crankshaft offset of the driver rods is about 90 degrees for use with a duplex pump.

In both the Gardner-Denver drive head 100 and the Wheatley drive head 200, the shaft about which reciprocating motion is obtained runs substantially perpendicular to and in substantially the same plane as the pistons, which are being driven. The shaft about which reciprocating motion is obtained is supported within the overall assembly at either end of the shaft.

The foregoing Gardner-Denver drive head 100 and the Wheatley drive head 200 are both relatively heavy in weight, have a low-performance, and are both generally costly to perform repair or replacement once installed. The weight and cost of repair of both the Gardner-Denver drive head 100 and the Wheatley drive head 200 are, for the most part, due to their construction. For example, the lobes of the Gardner-Denver drive heads 100 and the crankshaft design of the Wheatley drive head 200, are both supported at (e.g., beyond) opposing ends of a central shaft by the outer case housings. Accordingly, these designs assure that the reciprocating motion avoids clashing with the central shaft about which the rotation drive occurs due to the fact that the shaft is supported at two ends.

What is needed is a design that can eliminate the interference described hereinabove. Described herein are embodiments of a drive head that include a central, singular support bearing structure at or near a central point of the drive head. The central support structure eliminates the need for external supports at opposing ends of a central shaft of the drive head.

In some embodiments, certain components of a drive head according to the disclosure may employ off-the shelf gear components, including certain components, which may be used in differential gear systems employed in motorized vehicles. Using off the shelf components for certain features enables longevity of use and lower building and replacement cost for drive heads constructed according to principles of the disclosure.

Figure 3A:
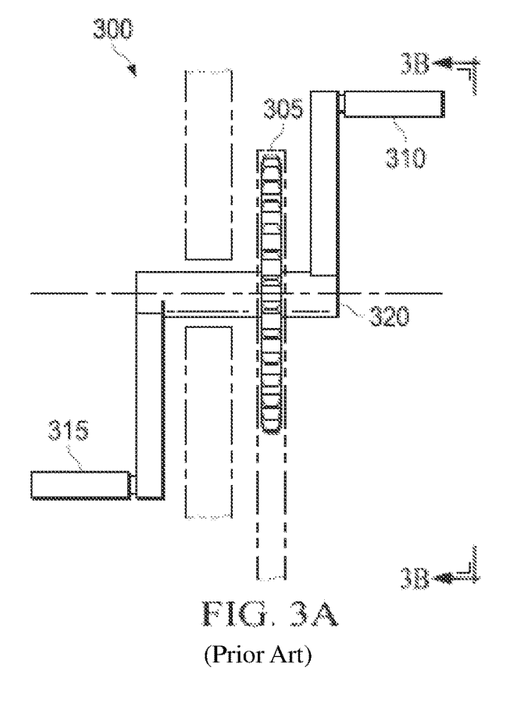
FIG. 3A is a top view illustrating drive pedals of a bicycle.
Figure 3B:
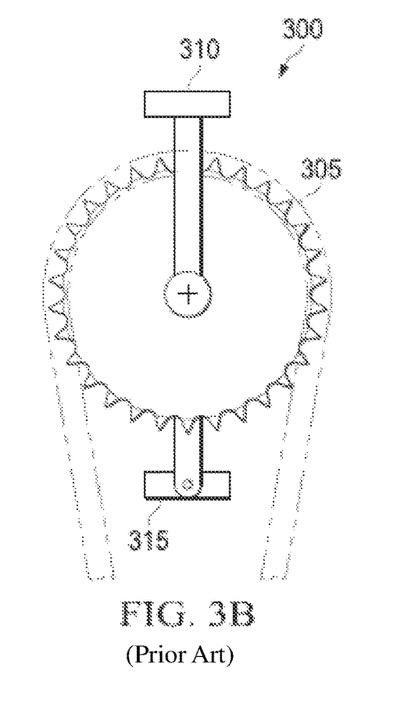
FIG. 3B is a sectional view of the bicycle drive pedals of FIG. 3 taken at 3B-3B.

To illustrate certain features and concepts related to embodiments of new drive heads according to the disclosure, a set of bicycle pedals 300 is shown in FIGS. 3A and 3B. In this illustrating, the bicycle pedals 310 and 315 are 180-degrees out of phase with each other and attached to a gear sprocket 305. The up and down (reciprocating) motion of a cyclist's legs are converted into rotary motion by the sprocket and applied to the drive wheel thereby providing motion. Because the gear sprocket shaft 320 is supported between the two pedals 310 and 315, there is no interference between the pedals 310 and 315 and the sprocket shaft 320.

Figure 4A:
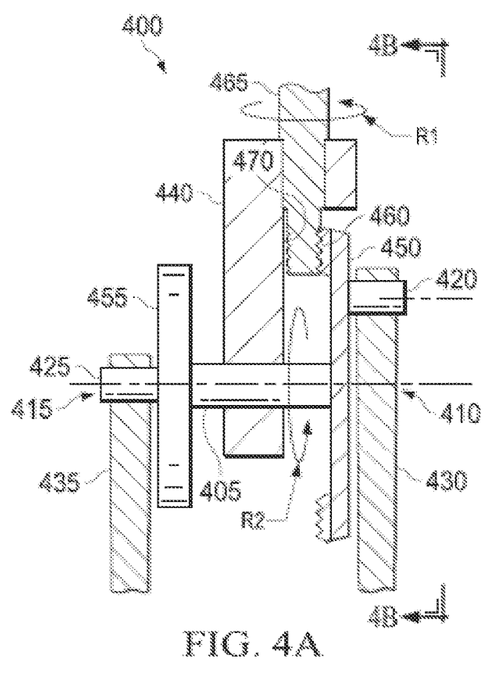
FIG. 4A is a front sectional view of one embodiment of a drive head according to principles of the disclosure.
Figure 4B:
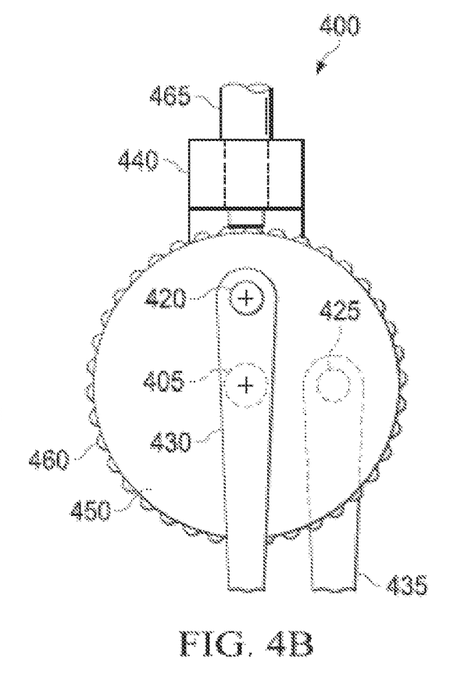
FIG. 4B is a sectional view of the embodiment of FIG. 4 taken at 4B-4B.

Referring now to FIGS. 4A and 4B, there is shown one embodiment of a drive head 400 according to the disclosure. The drive head 400 includes a central shaft 405 having a first end 410 and a second end 415. Coupled to the central shaft 405 proximate the first and second ends 410 and 415 are a first drive rod connection point 420 and a second drive rod connection point 425. In this embodiment, the first and second drive rod connection points 420 and 425 are located radially outside of a centerline of the central shaft 405. A first drive rod 430 is coupled to the first drive rod connection point 420 and a second drive rod 435 is coupled to the second drive rod connection point 425. A central support member 440 is coupled to the central shaft 405 between the first and second drive rod connection points 420 and 425. In some embodiments, the central support member 440 may be located at or near a midpoint between the first and second ends 410 and 415 of the central shaft 405. The central support member 440 provides complete support for the central shaft 405 and the features coupled to and supported thereon, and in one embodiment is the sole support for the central shaft 405, and thus the central shaft is not supported proximate the ends thereof.

In some embodiments, a first drive plate 450 is coupled to the first end 410 of the central shaft 405 and a second drive plate 455 is coupled to the second end 415 of the central shaft 405 and the first and second drive rod connection points 420 and 425 are directly coupled to the first and second drive plates 450 and 455 radially outside of the centerline of the central shaft 405. In this embodiment, a ring gear 460 is coupled to the first drive plate 450. The ring gear 460, in some embodiments, may be a hypoid ring gear and may be positioned between the first drive plate 450 and the central support member 440. While the illustrated embodiment has the ring gear 460 coupled to the first drive plate 450, other embodiments may exist wherein the ring gear 460 is coupled to the second drive plate 455.

In some embodiments, a drive shaft 465 may be coupled to the ring gear 460, the drive shaft 465 having a corresponding pinion gear 470 at a bottom end thereof. The drive shaft 465, in some embodiments, may extend through and be supported by the central support member 440. The drive shaft 465 may further include a motor for rotating the drive shaft 465 and pinion gear 470 in a first rotation direction R1. The drive shaft 460, pinion gear 465 and ring gear 460 translate the first rotation direction R1 to a second substantially perpendicular (at or about a 90° angle) rotation direction R2 of the central shaft 405. The first and second connection points 420 and 425 then translate the second substantially perpendicular rotation direction R2 of the central shaft to substantially linear translation of the first and second drive rods 430 and 435. The first and second drive rods 430 and 435 in turn attach to piston rods of a pump and impart reciprocating motion to the pistons within the pump. As used herein, the term substantially perpendicular, means that the first and second directions of rotation R1 and R2 are within about 10 degrees from perfectly perpendicular. Other embodiments may exist wherein one or both of the first or second directions of rotation R1 and R2 are ideally perpendicular, which means that one or both of the first and/or second directions of rotation R1 and R2 are within about 5 degrees from perfectly perpendicular. In some embodiments, the substantially linear translation of the first and second drive rods 450 and 455 may be within about 15 degrees of perpendicular to both the first rotation direction and the second rotation direction R1 and R2. As shown in FIG. 4B, the first and second drive rod connection points 420 and 425 may be offset from each other, in some embodiments, by about 90 degrees, and as such, the first and second drive rods 430 and 435 may likewise be offset from each other by about 90 degrees.

As shown in FIG. 4A, there is no interference with the central support member 440 or the drive shaft 465 with either of the first and second drive rods 420 and 425 and thus no possible interference with the pistons. Accordingly, there is no interference between any of the rotating features and the central support member 440. Accordingly, the lack of interference provides a functional advantage over both the Gardner-Denver drive head 100 or the Wheatley drive head 200, and other existing duplex (or triplex) pump technologies.

Figure 5:
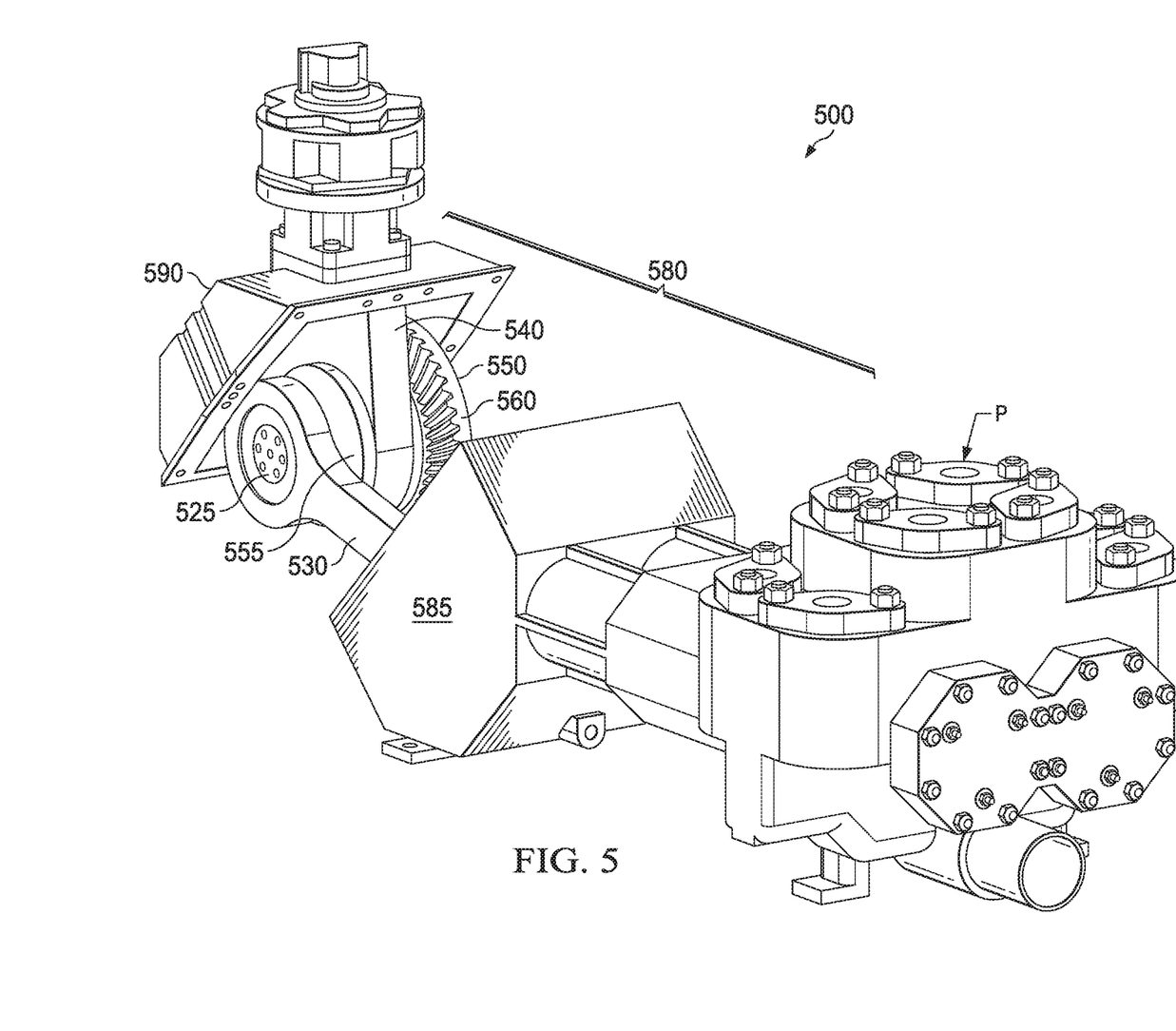
FIG. 5 is a perspective view of another embodiment of a drive head according to principles of the disclosure shown attached to drive rods.

Referring now to FIG. 5, there is shown another embodiment of a drive head 500 according to the disclosure. The drive head 500 is similar in many respects to the drive head 400 illustrated in FIGS. 4A and 4B. The drive head 500 includes a housing 580, the housing 580 including a drive head base 585 and a drive head top 590, wherein the drive head base 585 is coupled with pump P. In this embodiment, the central support member 540 may be coupled within the drive head top 590, and in some embodiments, may be incorporated as an integral component of the drive head top 590.

In this embodiment, the central shaft, first and second drive rod connection points 520 and 525, first and second drive plates 550 and 555, and the drive shaft may all be coupled with the drive head top 590. Accordingly, if a repair or replacement is needed to the drive head 500, the repair may be simple compared to repair or replacement of traditional drive heads such as either the Gardner-Denver drive head 100 and the Wheatley drive head 200. A mechanic would simply need to disconnect the first and second drive rods from pistons of pump P, separate the drive head base 585 from the drive head top 590, and repair or replace any components of the drive head 500. Likewise, the complete drive head 500, minus the housing 580 may be replaced.

Figure 6A:
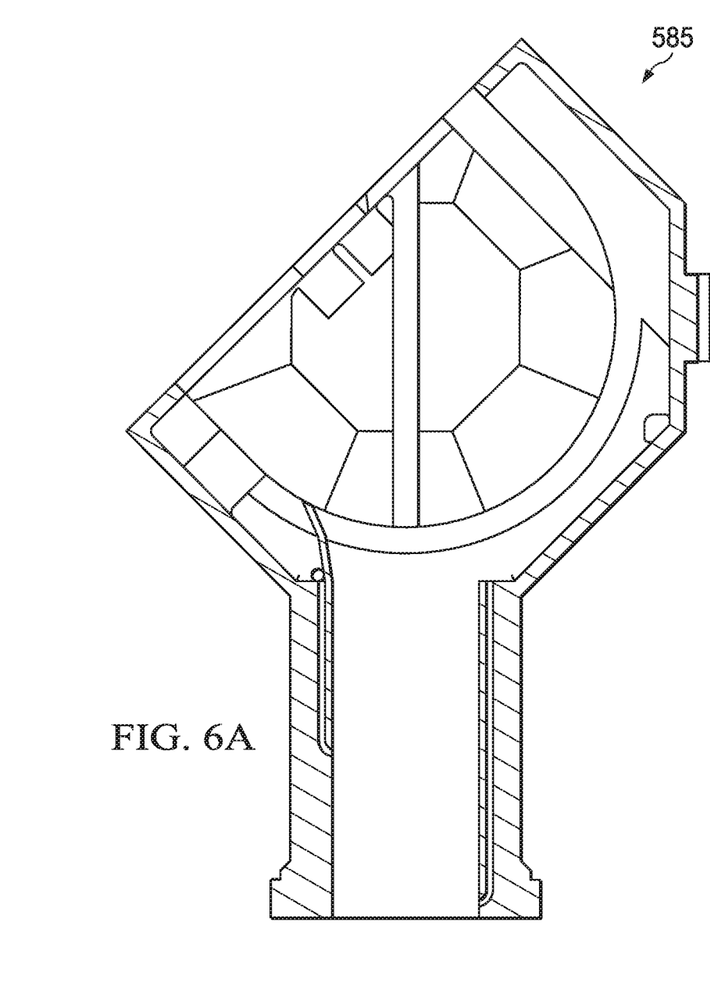
FIG. 6A is a first side view of one feature of one embodiment of a drive head according to principles of the disclosure.
Figure 6B:
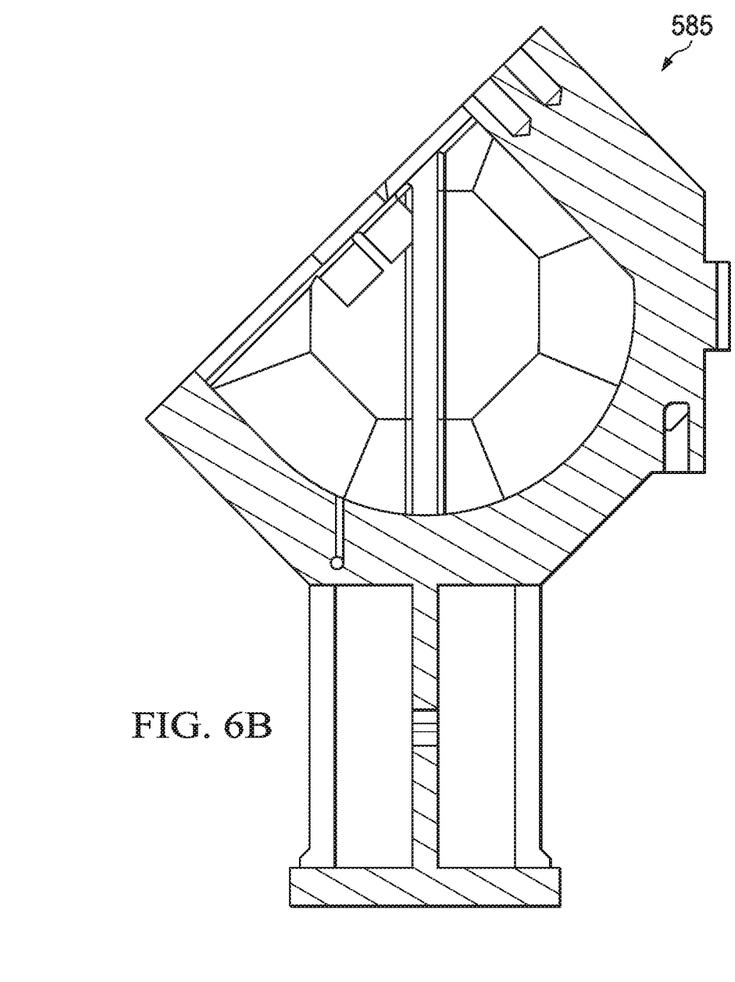
FIG. 6B is a second side view of the feature shown in FIG. 6A.
Figure 6C:
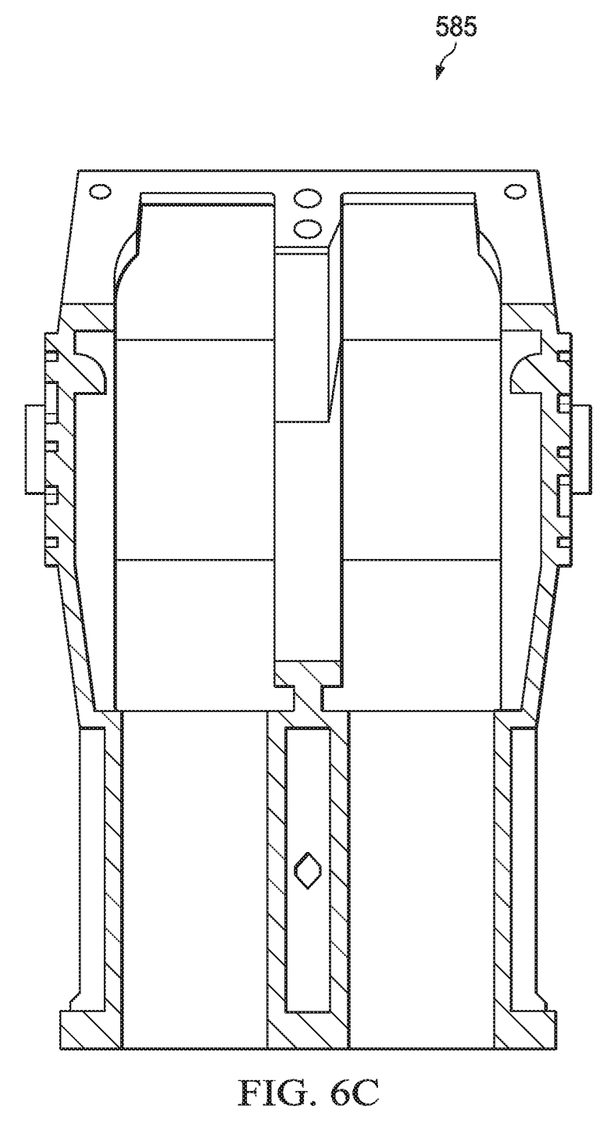
FIG. 6C is a top view of the feature shown in FIG. 6A.

Referring now to FIGS. 6A-6C, illustrated are various different views of the drive head base 585. More specifically, FIGS. 6A and 6B illustrate different side views of the drive head base 585, wherein FIG. 6C illustrates a bottom view of the drive head base 585. As shown in FIGS. 6A-6C, certain embodiments exist where there are no bearing surfaces in the drive head base 585.

Figure 7A:
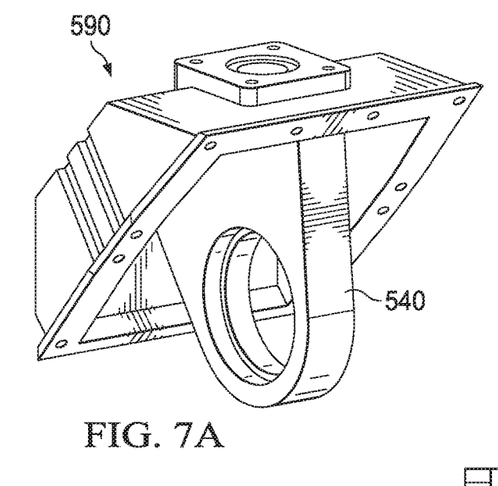
FIG. 7A is a perspective view of another feature of one embodiment of a drive head according to principles of the disclosure.
Figure 7B:
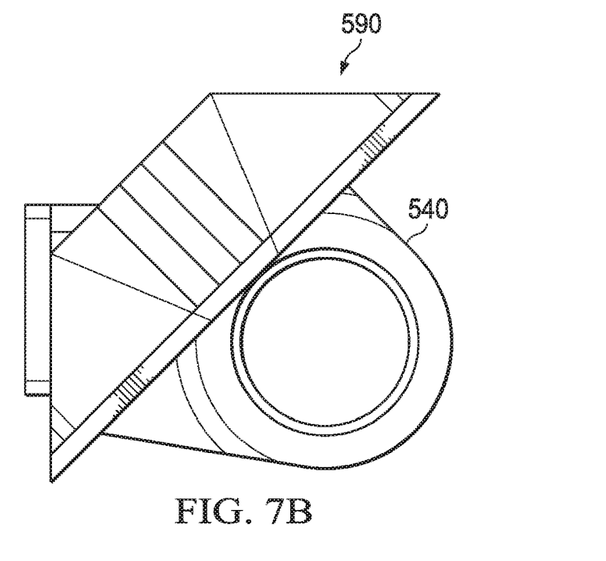
FIG. 7B is a side view of the feature shown in FIG. 7A.
Figure 7C:
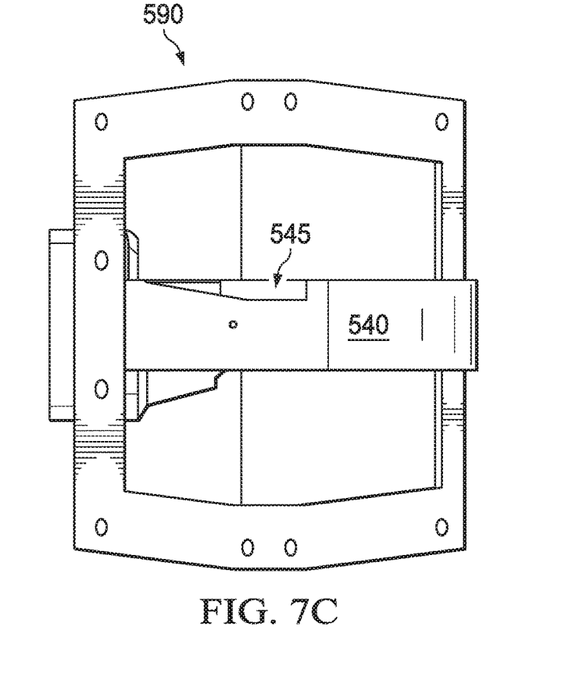
FIG. 7C is a top view of the feature shown in FIG. 7A.

Referring now to FIGS. 7A-7C, shown are a perspective, side, and top view of the drive head top 590. In this embodiment, the central support member 540 is shown coupled into the drive head top 590. However, in some embodiments, the central support member 540 may be an integral part of the drive head top 590 and in some embodiments, may be manufactured as part of the drive head top 590. As shown in FIG. 7C, the central support member 540 may include a clearance 545 in one side thereof to provide room for the corresponding pinion gear of the drive shaft, and the drive head top may include an opening drive shaft 565 to extend therethrough. As shown in FIGS. 7A-7C, there may be several bearing surfaces in the drive head top 590.

Figure 8A:
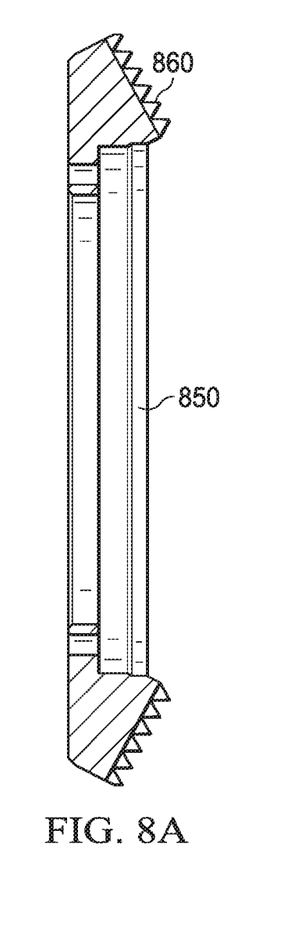
FIG. 8A is a front view of yet another feature of one embodiment of a drive head according to principles of the disclosure.
Figure 8B:
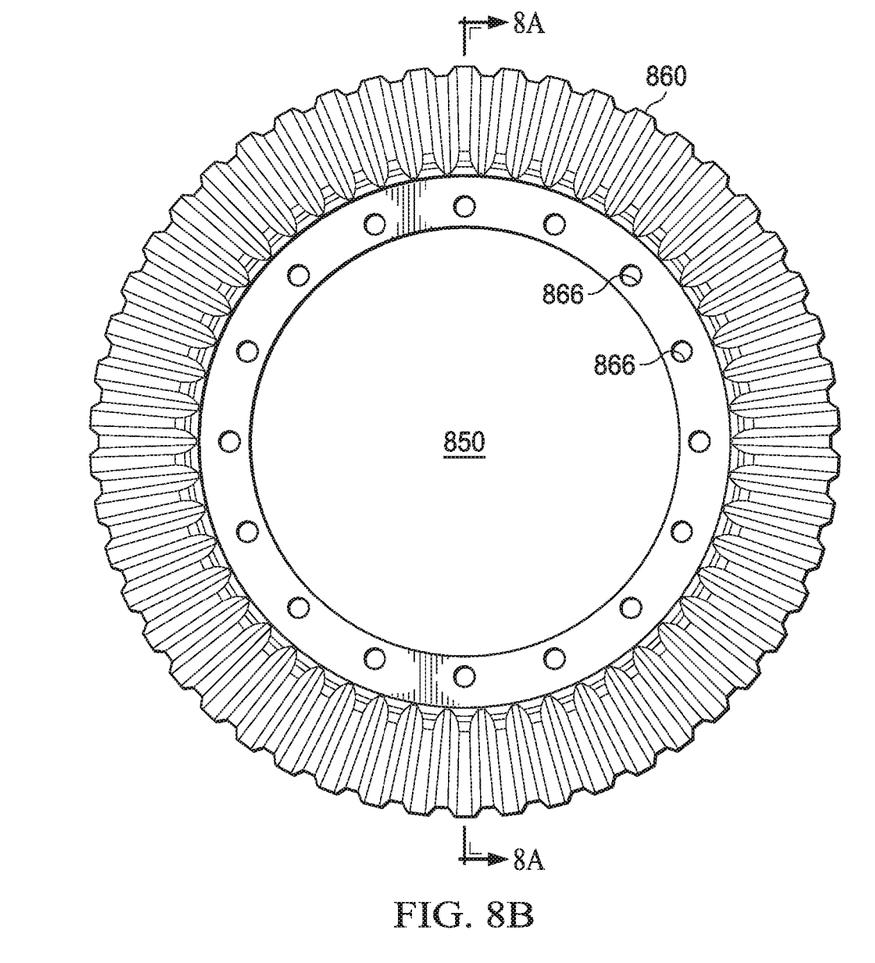
FIG. 8B is a side section view of the feature shown in 8A taken along section 8B-8B.

FIGS. 8A-8B illustrate one embodiment of a first drive plate 850, which is similar to first drive plate 450. FIG. 8A is a side section view of the first drive plate 850 and FIG. 8B is a front view. First drive plate 850, in some embodiments, includes a ring gear 860 attached thereto. In this embodiment, the ring gear 860 may be a hypoid ring gear and may be coupled to the drive plate 850 by a plurality of fasteners 866. In some embodiments the fasteners 866 may be bolts, but other fasteners generally used in motors, drive heads, and the like may be used. In some embodiments, a major surface of the first drive plate 850 may be fastened substantially perpendicular (about 90°) to a central shaft, such as central shaft 440.

Figure 9A:
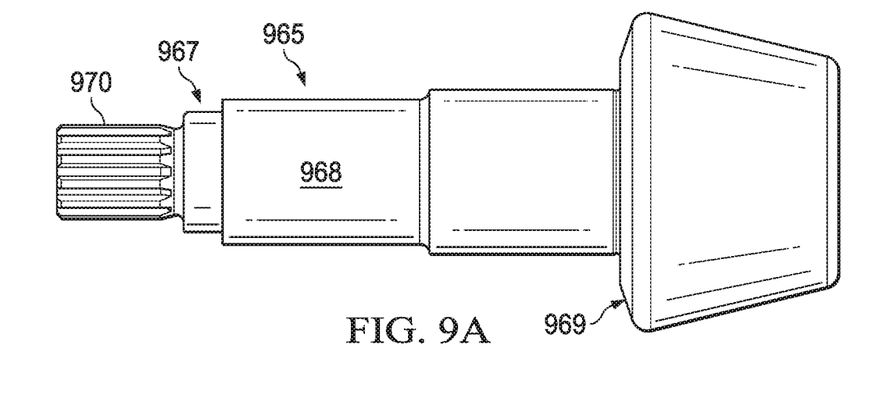
FIG. 9A is a side view of another feature of one embodiment of a drive head according to principles of the disclosure.
Figure 9B:
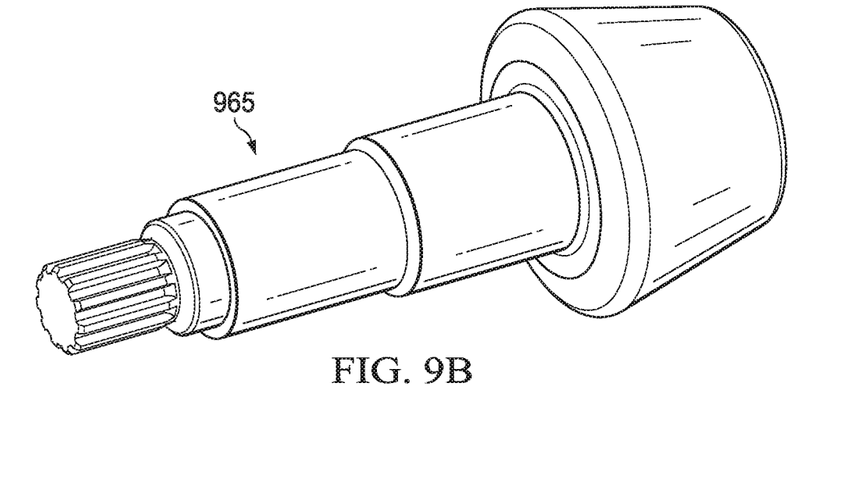
FIG. 9B is a perspective view of the feature shown in FIG. 9A.

Referring now to FIGS. 9A and 9B, there is shown a side view and a perspective view of a drive shaft 965 which may be similar to drive shaft 465. Drive shaft 965 may include a pinion gear 970 at a first end 967 thereof, which may couple with a ring gear such as ring gear 460. In some embodiments the drive shaft 965 may include a center portion 968, which may extend through and be supported by a central support member such as the central support member 440. The drive shaft 965 may also be coupled with and support in a cross bearing of a housing, such as drive head top 590. The drive shaft 965 may further include a motor (not shown) at a second end 969 thereof for rotating the drive shaft 965 and pinion gear 970.

For simplicity, the following components have not been shown in the drawings: bearings, lubrication ports/channels, and the like. Those skilled in the art should understand the nature and placement of these components.

Although this disclosure relates to a drive head for use with a duplex pump, the embodiments shown may be modified to be used with triplex pumps and any pump that uses a moving reciprocating piston within a cylinder to pump/pressurize a fluid. If applying the embodiments disclosed to include a triplex pump, an additional drive rod connection point, drive rod, and drive plate containing a drive bearing may be added, on a side of the central support member opposite side the first drive plate and ring gear and supported and attached with the central shaft. In a triplex pump drive head, the drive rod connection points would have about a 60 degree phase relationship relative to each other in a double acting pump. Embodiments of the drive head may also be used with a quadplex pump by adding an additional drive plate and drive rod. However, the four drive rods would then have a 45-degree phase relationship relative to each other. Additional drive plates may be added until a point of impractically is reached.

Those skilled in the art to which this application relates will appreciate that other and further additions, deletions, substitutions and modifications may be made to the described embodiments.

What is claimed is:

1. A drive head for use with a pump, comprising:
   a central shaft having a first end and a second end;
   first and second drive rod connection points coupled to the central shaft proximate the first and second ends, the first and second drive rod connection points being located radially outside of a centerline of the central shaft;
   first and second drive rods coupled to the first and second drive rod connection points;
   a central support member coupled to the central shaft between the first and second drive rod connection points;
   a first gear configured to rotate in a first rotation direction (R1), the first gear coupled to a drive shaft, the drive shaft supported by the central support member; and
   a second gear coupled to the central shaft and coupled to the first gear, wherein the second gear is configured to convert the first rotation direction (R1) of the first gear to a second rotation direction (R2) of the central shaft, the second rotation direction (R2) substantially perpendicular to the first rotation direction (R1).

2. The drive head according to claim 1, further including first and second drive plates coupled to the first and second ends of the central shaft, and further wherein the first and second drive rod connection points are directly coupled to the first and second drive plates radially outside of the centerline of the central shaft.

3. The drive head according to claim 2, wherein the second gear is a ring gear coupled to the first drive plate.

4. The drive head according to claim 3, wherein the ring gear coupled to the first drive plate is a hypoid ring gear positioned between the first drive plate and the central support member.

5. The drive head according to claim 3, wherein the first gear is a pinion gear.

6. The drive head according to claim 5, further including a motor for rotating the drive shaft and pinion gear in the first rotation direction (R1), wherein the drive shaft, pinion gear and ring gear convert the first rotation direction (R1) of the first gear to the second rotation direction (R2) of the central shaft, and further wherein the first and second connection points convert the second rotation direction (R2) of the central shaft to a movement of the first and second drive rods.

7. The drive head according to claim 5, wherein the drive shaft extends through the central support member.

8. The drive head according to claim 1, wherein the central shaft, first and second drive rod connection points, first and second drive rods and at least a portion of the drive shaft are enclosed in a housing, and further wherein the central support member is coupled to the housing.

9. The drive head according to claim 8, wherein the housing includes a drive head base and a drive head top.

10. The drive head according to claim 9, wherein the central support member is integral to the drive head top.

11. The drive head according to claim 9, wherein the drive head base and the drive head top are secured together by bolts.

12. The drive head according to claim 1, wherein the central support member is the sole support member for the central shaft.

13. The drive head according to claim 1, wherein the central support member is coupled to the central shaft halfway between the first and second drive rod connection points.

14. The drive head according to claim 1, wherein the first and second drive rod connection points are radially offset from each other by 90 degrees.

15. A drive head for use with a pump, comprising:
    a central shaft having a first end and a second end;
    first and second drive plates coupled to the first and second ends of the central shaft;
    first and second drive rod connection points coupled to the first and second drive plates radially outside of a centerline of the central shaft;
    first and second drive rods coupled to the first and second drive rod connection points;
    a central support member coupled to the central shaft between the first and second drive rod connection points;
    a first gear configured to rotate in a first rotation direction (R1), the first gear coupled to a drive shaft, the drive shaft supported by the central support member; and
    a second gear coupled to the central shaft and coupled to the first gear, wherein the second gear is configured to convert the first rotation direction (R1) of the first gear to a second rotation direction (R2) of the central shaft, the second rotation direction (R2) substantially perpendicular to the first rotation direction (R1); and
    a housing enclosing the central shaft, first and second drive rod connection points, first and second drive rods and at least a portion of a drive shaft coupled to the first gear.

16. The drive head according to claim 15, wherein the central support member is coupled to the housing.

17. The drive head according to claim 16, wherein the housing includes a drive head base and a drive head top, and further wherein the central support member is integral to the drive head top.

18. The drive head according to claim 15, wherein the central support member is the sole support member for the central shaft.

19. The drive head according to claim 15, wherein the central support member is coupled to the central shaft halfway between the first and second drive rod connection points.

20. The drive head according to claim 15, wherein:
    the second gear is a hypoid ring gear coupled to the first drive plate, the hypoid ring gear positioned between the first drive plate and the central support member;
    the first gear is a pinion gear coupled to a drive shaft, the pinion gear coupled to the hypoid ring gear; and
    a motor for rotating the drive shaft and pinion gear in the first rotation direction (R1), wherein the drive shaft, pinion gear and ring gear convert the first rotation direction (R1) of the first gear to the second rotation direction (R2) of the central shaft, and further wherein the first and second connection points convert the second rotation direction (R2) of the central shaft to a movement of the first and second drive rods.

* * * * *